US 8,347,683 B2
Jan. 8, 2013

(54) TEXTURING OF THE SEAL SURFACE FOR A ROLLER CONE ROCK BIT

(75) Inventor: Xiaobin Lu, Coppell, TX (US)

(73) Assignee: Varel International Ind., L.P., Carrollton, TX (US)

( * ) Notice: Subject to any disclaimer, the term of this patent is extended or adjusted under 35 U.S.C. 154(b) by 291 days.

(21) Appl. No.: 12/399,171

(22) Filed: Mar. 6, 2009

(65) Prior Publication Data

US 2009/0232428 A1    Sep. 17, 2009

Related U.S. Application Data

(60) Provisional application No. 61/036,762, filed on Mar. 14, 2008.

(51) Int. Cl.
*C21D 7/06* (2006.01)
*E21B 10/00* (2006.01)

(52) U.S. Cl. ............................. 72/53; 175/371

(58) Field of Classification Search ........ 72/53; 29/90.7, 29/90.01; 174/337, 339, 371; 175/337, 339, 175/371

See application file for complete search history.

(56) References Cited

U.S. PATENT DOCUMENTS

| | | | |
|---|---|---|---|
| 2,697,014 A | 12/1954 | Boice et al. | |
| 3,839,774 A | 10/1974 | Jackson, Jr. | |
| 4,248,485 A | 2/1981 | White et al. | |
| 4,619,534 A | 10/1986 | Daly et al. | |
| 4,708,752 A | 11/1987 | Kar | |
| 5,485,890 A | 1/1996 | Cawthorne et al. | |
| 5,535,838 A | 7/1996 | Keshavan et al. | |
| 5,592,840 A | 1/1997 | Miyasaka | |
| 5,816,088 A * | 10/1998 | Yamada et al. | 72/53 |
| 5,944,125 A | 8/1999 | Byrd | |
| 6,446,520 B1 | 9/2002 | Nagai et al. | |
| 6,508,093 B2 * | 1/2003 | Berthelet et al. | 72/53 |
| 6,598,689 B1 | 7/2003 | Slaughter, Jr. et al. | |
| 6,881,500 B2 | 4/2005 | Sugiyama | |
| 7,052,400 B2 * | 5/2006 | Kura et al. | 464/111 |
| 7,128,171 B2 | 10/2006 | Dick et al. | |
| 7,582,174 B2 * | 9/2009 | Vigneau | 148/565 |
| 7,703,312 B2 * | 4/2010 | David | 72/53 |
| 7,708,090 B2 | 5/2010 | Zahradnik et al. | |
| 7,762,113 B2 | 7/2010 | Prevey, III | |
| 2004/0265620 A1 | 12/2004 | Sugiyama | |
| 2005/0252691 A1 | 11/2005 | Bramlett et al. | |

(Continued)

FOREIGN PATENT DOCUMENTS

WO    WO 03/040591 A1    5/2003

(Continued)

OTHER PUBLICATIONS

International Search Report, PCT/US2009/037029, dated Oct. 29, 2009, 3 pages.

(Continued)

*Primary Examiner* — Edward Tolan (74) *Attorney, Agent, or Firm* — Gardere Wynne Sewell, LLP (57) ABSTRACT

Surface texturing is employed to modify the topography of one or more surfaces (radial or cylindrical) of the sealing system for a roller cone rock bit. The surface texturing results in a dimpled surface which retains additional lubricant helpful in reducing friction in the boundary and mixed lubrication regimes. Shot peening is disclosed as one method for texturing the desired surface.

18 Claims, 10 Drawing Sheets

U.S. PATENT DOCUMENTS

| | | | |
|---|---|---|---|
| 2006/0243494 A1 | 11/2006 | Koltermann et al. |
| 2007/0081747 A1 | 4/2007 | Dick et al. |
| 2007/0284150 A1 | 12/2007 | Lin |
| 2009/0232434 A1 | 9/2009 | Lu |
| 2010/0038144 A1 | 2/2010 | Stauffer |
| 2010/0071960 A1 | 3/2010 | Curry et al. |
| 2010/0089657 A1 | 4/2010 | Lin |
| 2011/0048810 A1 | 3/2011 | Lin et al. |

FOREIGN PATENT DOCUMENTS

| | | | |
|---|---|---|---|
| WO | WO 2007/146276 A1 | 12/2007 | |

OTHER PUBLICATIONS

Written Opinion, PCT/US2009/037029, dated Oct. 29, 2009, 6 pages.

Written Opinion of the International Searching Authority, International Application No. PCT/US2009/037029, dated Oct. 29, 2009.

Wang, Jane Q. et al., Virtual Texturing: Modeling the Performance of Lubricated Contacts of Engineered Surfaces, Transactions of the ASME, vol. 127, Oct. 2005, pp. 722-728.

Etsion, I et al., Analytical and Experimental Investigation of Laser-Textured Mechanical Seal Faces, Tribology Transactions, vol. 42, (1999), 3, pp. 511-516.

Xiaobin, Lu et al., An Experimental Investigation of Dimple Effect on the Stribeck Curve of Journal Bearings, Tribol Lett, (2007), 27:169-176, DOI, 10.1007/s11249-007-9217-x.

Gulf Publishing Company, Excerpt from "Seals and Sealing Handbook", pp. 24-25.

Khonsari, Michael M., et al., Applied Tribology, Bearing Design and Lubrication, A Wiley-Interscience Publication, Finite Journal Bearing Design and Analysis, p. 229.

Singapore Written Opinion mailed Sep. 21, 2011 for SG 201006656-1 (13 pages).

SG Written Opinion dated Dec. 13, 2011 for SG 201006654-6 (11 pages).

Wang, Q. Jane et al., "Virtual Texturing: Modeling the Performance of Lubricated Contacts of Engineered Surfaces", Transactions of the ASME, vol. 127, Oct. 2005, pp. 722-728.

Etsion, I. et al., "Analytical and Experimental Investigation of Laser-Textured Mechanical Seal Faces", Tribology Transactions, vol. 42, (1999), 3, pp. 511-516, Jan. 1999.

Xiaobin Lu, et al., "An Experimental Investigation of Dimple Effect on the Stribeck Curve of Journal Bearings", Tribol Lett (2007) 27:169-176, DOI 10.1007/s11249-007-9217-x, May 2007.

\* cited by examiner

TEXTURING OF THE SEAL SURFACE FOR A ROLLER CONE ROCK BIT

PRIORITY CLAIM

This application claims the benefit of U.S. Provisional Application for Patent Ser. No. 61/036,762 filed Mar. 14, 2008, the disclosure of which is hereby incorporated by reference.

TECHNICAL FIELD OF THE INVENTION

The present invention relates generally to earth boring bits, and more particularly to roller cone rock bits.

BACKGROUND

A roller cone rock bit is the cutting tool used in oil, gas, and mining fields to break through the earth formation to shape a well bore. Load and motion of the bit are transferred to the bearings inside three head and cone assemblies. For the bit where a journal bearing is employed, the main journal bearing is charged with as much as 80 percent of the total radial load. The main journal bearing is composed of the head (as the shaft), the bushing, and the cone (as the housing). This bearing is lubricated and sealed. An outer circumference of the seal is compressed by a gland of the cone so that the seal moves together with the cone and slides against the head (at a sealing surface or seal boss) on the inner circumference of the seal. The seal is thus confined in the seal gland to secure the lubricant within the bearing and prevent debris from invading into the bearing. The longer the seal excludes contamination from the bearing, the longer the bearing life. Therefore, the seal can become the limiter of the rock bit life.

An elastomer seal is known in the prior art as the dominant sealing element in rock bits. Various types of elastomer seals have been developed. The seal is very flexible, and is compatible with the drilling mud. The seal has excellent resilience at relatively high temperatures. Thus, the seal has proved to be sufficient to provide enough sealing force to separate the mud and debris environment from the lubricant over an acceptable period of time.

However, friction between the seal and surfaces of the seal gland as the cone rotates can cause damage to the seal itself. Over time, this damage accumulates to the point where the seal itself fails. Following seal failure, the bearing experiences grease starvation in the contact zone due to loss of lubricant in the bearing system. Thereafter, excessive wear appears on the bearing system surfaces due to shearing and heating caused by sliding friction. The end result is typically scoring, scuffing, and even catastrophic failure like galling or seizure. It is thus imperative that lubrication be retained between contact interface surfaces of the journal bearing. Maintaining seal life is thus critical to maintaining bit life.

One way to extend seal life is to reduce the friction between seal and head. Under typical running conditions, the seal experiences mixed lubrication. In this lubrication regime, more lubricant is necessary at the contact point between the seal and one or more of the gland surfaces in order to reduce the friction. Thus, there is a need in the art to introduce more lubricant in the sealing zone.

Figure 1A:
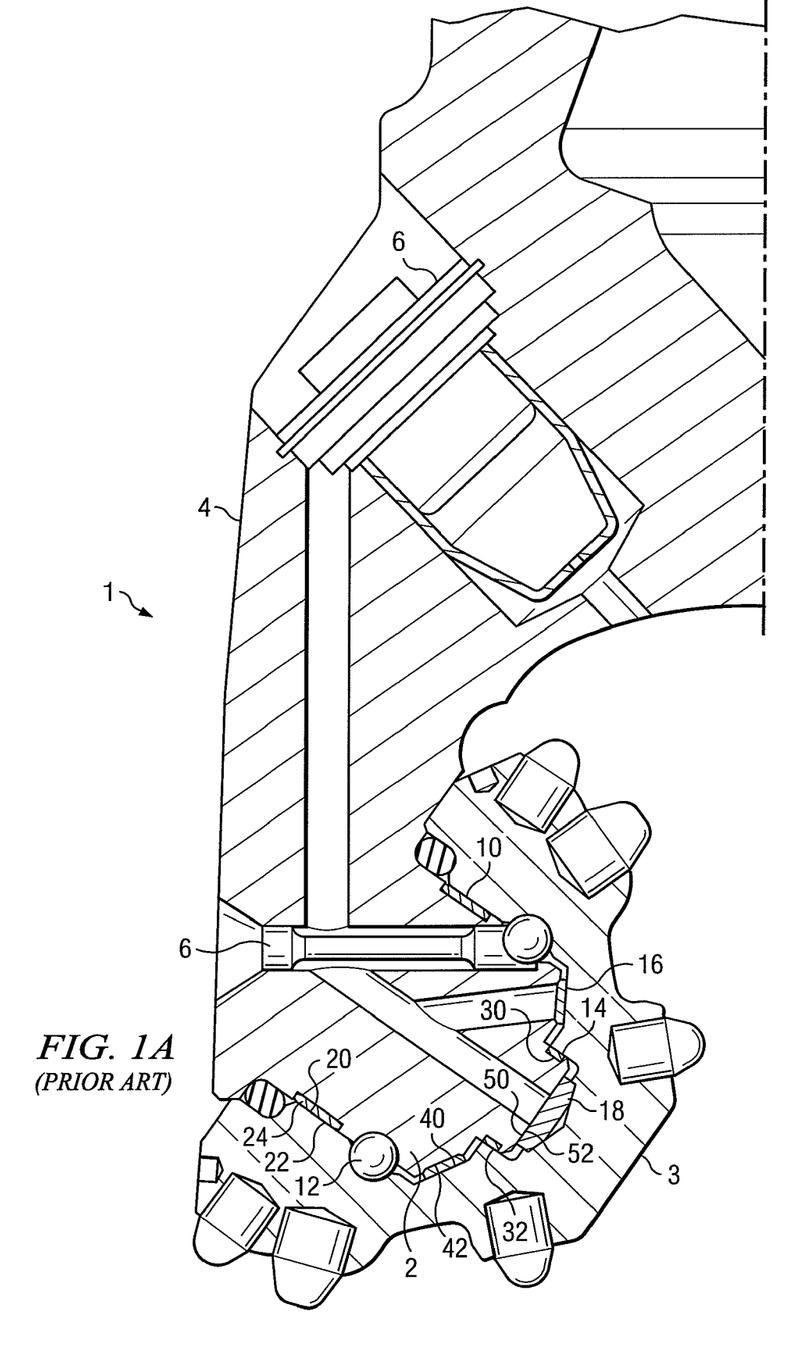
FIG. 1 illustrates a partially broken away view of a typical roller cone rock bit.

Reference is made to FIG. 1 which illustrates a partially broken away view of a typical roller cone rock bit. FIG. 1 more specifically illustrates one head and cone assembly. The general configuration and operation of such a bit is well known to those skilled in the art.

The head 1 of the bit includes the bearing shaft 2. A cutting cone 3 is rotatably positioned on the bearing shaft 2 which functions as a journal. A body portion of the bit includes an upper threaded portion forming a tool joint connection 4 which facilitates connection of the bit to a drill string (not shown). A lubrication system 6 is included to provide lubrication to, and retain lubricant in, the journal bearing between the cone 3 and the bearing shaft 2. This system 6 has a configuration and operation well known to those skilled in the art.

A number of bearing systems are provided in connection with the journal bearing supporting rotation of the cone 3 about the bearing shaft 2. These bearing systems include a first cylindrical friction bearing 10 (also referred to as the main journal bearing herein), ball bearings 12, second cylindrical friction bearing 14, first radial friction (thrust) bearing 16 and second radial friction (thrust) bearing 18.

Figure 2:
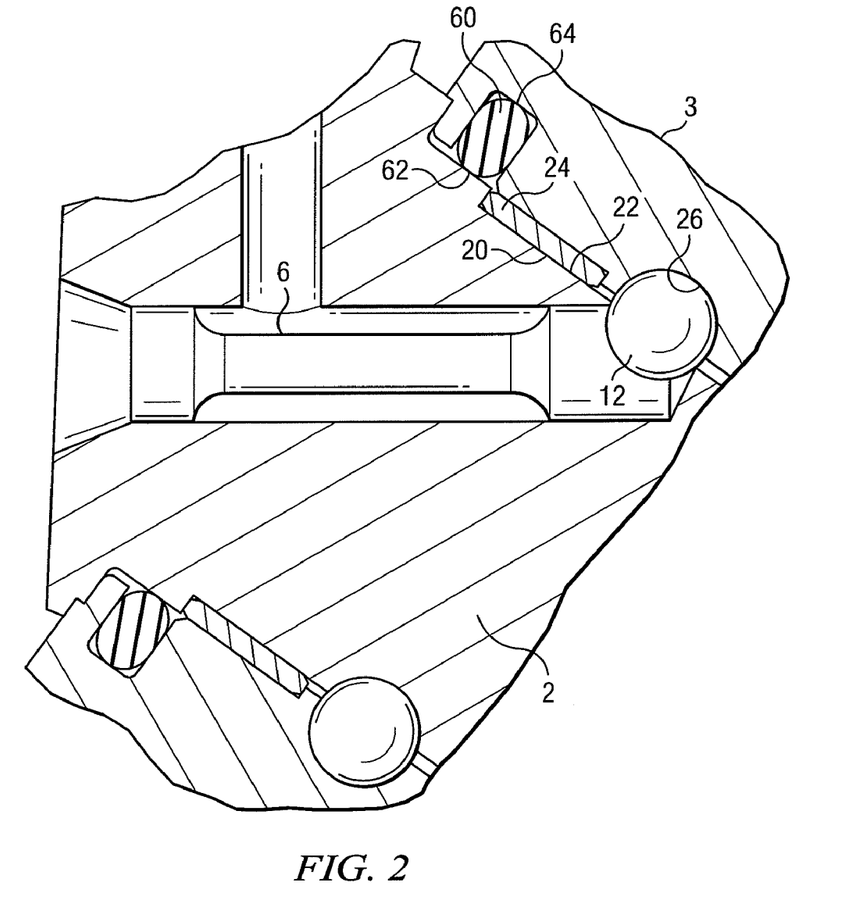
FIG. 2 illustrates of a partially broken away view of another typical roller cone rock bit.

FIG. 2 illustrates a partially broken away view of FIG. 1 showing the bearing system and sealing system in greater detail. The first cylindrical friction bearing 10 is defined by an outer cylindrical surface 20 on the bearing shaft 2 and an inner cylindrical surface 22 of a bushing 24 which has been press fit into the cone 3. This bushing 24 is a ring-shaped structure typically made of beryllium copper, although the use of other materials is known in the art. The ball bearings 12 ride in an annular raceway 26 defined at the interface between the bearing shaft 2 and cone 3. The second cylindrical friction bearing 14 is defined by an outer cylindrical surface 30 on the bearing shaft 2 and an inner cylindrical surface 32 on the cone 3. The outer cylindrical surface 30 is inwardly radially offset from the outer cylindrical surface 20. The first radial friction bearing 16 is defined between the first and second cylindrical friction bearings 10 and 12 by a first radial surface 40 on the bearing shaft 2 and a second radial surface 42 on the cone 3. The second radial friction bearing 18 is adjacent the second cylindrical friction bearing 12 at the axis of rotation for the cone and is defined by a third radial surface 50 on the bearing shaft 2 and a fourth radial surface 52 on the cone 3.

With respect to the sealing system, an o-ring seal 60 is positioned between cutter cone 3 and the bearing shaft 2. A sealing surface, for example, a cylindrical surface seal boss 62, is provided on the bearing shaft. In the illustrated configuration, this sealing surface provided by the seal boss 62 is cylindrical and outwardly radially offset (by the thickness of the bushing 24) from the outer cylindrical surface 20 of the first friction bearing 10. It will be understood that the sealing surface (of the seal boss 62 for example) could exhibit no offset with respect to the main journal bearing surface, or be inwardly radially offset, if desired. Additionally, it will be understood that the sealing surface (62) need not be cylindrical but rather may be conical if desired. An annular groove is formed in the cone 3 to define the seal gland 64. The groove and sealing surface (seal boss 62) align with each other when the cutting cone 3 is rotatably positioned on the bearing shaft to define the gland 64 region. The o-ring seal 60 is compressed between the surface(s) of the gland 64 and the sealing surface (seal boss 62), and functions to retain lubricant in the bearing area around the bearing systems and prevents any materials (drilling mud and debris) in the well bore from entering into the bearing area.

Load in the bearing system is supported by both asperity contact and hydrodynamic pressure. Lubricant is provided in the first cylindrical friction bearing 10, second cylindrical friction bearing 14, first radial friction bearing 16 and second radial friction bearing 18 between the implicated cylindrical and radial surfaces using the system 6. Lubricant is retained in the bearing system by the compressed seal 60 in the gland 64.

That lubricant not only lubricates the bearing system, but also provides a measure of lubricant on the surfaces of the seal gland 64, and especially the sealing surface such as the seal boss 62 surface, that assists in allowing the compressed seal 60 to slide along the sealing surface (for example, seal boss 62 outer cylindrical surface) as the cone rotates.

The seal is designed to withstand a high pressure in downhole drilling applications. That high pressure, together with a designed high compression rate of the seal in gland, compresses the seal tightly against the seal boss 62. The lubricant which is present in the sealing zone at the seal boss surface provides lubrication to the seal and takes away friction heat. In the case where the seal is not well lubricated, it slides dry against the seal boss and a large amount of friction heat is generated. This friction heat is known to be the root cause of seal failure. It is accordingly desirable to introduce more lubricant underneath the seal, such as on the seal boss 62 surface (or other sliding gland surface), in order to reduce friction and carry away heat.

It is not unusual for the bearing to experience grease starvation in these surface contact zones of the bearing system. This can result in scoring, scuffing, and even catastrophic failure like galling or seizure of the journal bearing. There is accordingly also a need to retain lubricant in position trapped between the implicated and opposed cylindrical and radial surfaces of the bearing system.

Reference is made to the following prior art documents: U.S. Pat. No. 3,839,774 (Oct. 8, 1974), U.S. Pat. No. 4,248,485 (Feb. 3, 1981) and U.S. Pat. No. 5,485,890 (Jan. 23, 1996): U.S. Publication 2005/0252691 (Nov. 17, 2005); and PCT Publication WO 2007/146276 (Dec. 21, 2007), the disclosures of which are hereby incorporated by reference.

SUMMARY

To address issues of grease starvation and possible seal failure, it is desired to increase the amount of lubricant that can be maintained in the surface contact zones of the sealing system. In an effort to introduce more lubricant into these surface contact zones, the surface topography of the sealing system (for example, seal gland surfaces) is modified in the manner described below.

Surface texturing is employed to modify the topography of one or more surfaces (radial, conical or cylindrical) of the sealing system for a rock bit. Innovative methods and apparatus are described with respect to certain features of surface texturing and its beneficial effect on reducing friction and prolonging bit life. These features address deficiencies of the prior art with respect to the configuration and operation of the sealing surfaces.

In accordance with an embodiment, the surface topography of the sealing system is modified by surface texturing technology. A surface texture is introduced, preferably on the seal boss cylindrical surface at the seal location, to the sealing system for the roller cone rock bit. The surface texturing disclosed herein includes dimples which retain additional lubricant and are thus helpful to reduce friction at the seal.

Surface texturing as described herein creates specially patterned dimples on one or more surfaces of the sealing system. With reference once again made to FIGS. 1 and 2, the textured surface in the sealing system in accordance with embodiments described herein is preferably the seal boss 62 surface. It will be understood, however, that depending on the configuration of the gland 64, one or more other surfaces associated with defining the gland and compressing the seal 60 could have a surface texturing as well. Thus, any desired surface, including cylindrical, conical and radial surfaces, of the gland 64 area for the sealing system could possess a surface texturing Further, any combination of textured surfaces, with untextured surfaces, may be used in the sealing system.

To address issues of grease starvation and possible bearing failure, it is also desired to increase the amount of lubricant that can be maintained in the surface contact zones of the bearing system. In an effort to introduce more lubricant into these surface contact zones, the surface topography of the bearing system is modified in the manner described below. Surface texturing is employed to modify the topography of one or more surfaces (radial or cylindrical) of the bearing system for a rock bit.

Due to heavy load and low velocity, the head shaft and the bushing of the main journal bearing are in contact at the loading side of the bearing system. This metal-to-metal contact dominates the frictional behavior of the bearing system. The friction coefficient can normally reach over 0.1, which generates enormous heat and can lead to bearing and seal failure. To improve the bearing life, the friction has to be reduced. In a mixed lubrication regime, there are two means to create better lubrication in these surface contact areas: supply more grease or generate greater hydrodynamic pressure.

In accordance with an embodiment, the topography of the head bearing system is modified by surface texturing technology. A surface texture is introduced, either on the head side or on the bushing (or cone) side (or both), of the bearing system for the roller cone rock bit. The surface texturing disclosed herein includes dimples which retain additional lubricant and are thus helpful to reduce the friction in the boundary and mixed lubrication regimes.

Surface texturing as described herein creates specially patterned dimples on one or more surfaces of the bearing system. Reference is once again made to FIGS. 1 and 2 for an identification of possible textured surfaces in the bearing system in accordance with embodiments described herein. In one implementation, the surface texturing is provided on an outer cylindrical surface 20 of the bearing shaft 2 which forms part of the first cylindrical friction bearing 10. In another implementation, the surface texturing is provided on an inner cylindrical surface 22 of the bushing 24 which has been press fit into the cone 3 and which forms part of the first cylindrical friction bearing 10. In yet another implementation, the surface texturing is provided on an outer cylindrical surface 30 of the bearing shaft 2 which forms part of the second cylindrical friction bearing 14. In still another implementation, the surface texturing is provided on an inner cylindrical surface 32 of the cone 3 which forms part of the second cylindrical friction bearing 14. In another implementation, the surface texturing is provided on a first radial surface 40 of on the bearing shaft 2 which forms part of the first radial friction bearing 16. In yet another implementation, the surface texturing is provided on a second radial surface 42 of the cone 3 which forms part of the first radial friction bearing 16. In still another implementation, the surface texturing is provided on a third radial surface 50 of the bearing shaft 2 which forms part of the second radial friction bearing 18. In yet another implementation, the surface texturing is provided on a fourth radial surface 52 of the cone 3 which forms part of the second radial friction bearing 18. Any combination of the foregoing textured surfaces, with untextured surfaces, may also be used.

The dimples of the surface texturing behave as lubricant reservoirs which permeate the lubrication into the inter-space of metal asperities. Meanwhile, higher hydrodynamic pressure is generated on the dimple area. Both functions will facilitate an improvement in sealing or bearing system lubrication with a reduction in friction.

The percentage coverage area with respect to the dimples may be the same or different for the sealing surface and bearing surface. In one implementation, the coverage is the same, and it is preferred that the dimples of surface texture cover between 60-100% of the surface of interest. Even more preferably, the dimples should cover between 70-90% of the surface of interest. In an implementation, the dimples cover substantially 100% of the surface of interest. In another implementation, the sealing surface may have a lighter shot peen than the bearing surface. So, the bearing surface texture coverage may have the percentages as described previously, while the sealing surface has a lower texture coverage area. Examples of the lower surface texture coverage include 5-60%.

Embodiments herein utilize any one or more of a variety of methods to create surface texturing including: machining, chemical etching, laser texturing, deep rolling, vibratory finishing, etc. Controllability, uniformity, cost, coverage area, dimple size, dimple depth, and dimple shape are the factors which determine which method is selected to form the texturing.

In a preferred implementation, shot peening is used to create the dimples of the surface texturing. More specifically, a two-step shot peening process is used. In accordance with this two-step process, in a first step the sealing or bearing system surface to be treated is exposed to a first shot peening action wherein the surface is bombarded at a first intensity level by small spherical media (the "shot") of a first average size. In a second step the same sealing or bearing system surface being treated is exposed to a second shot peening action at a second intensity level wherein the surface is bombarded by small spherical media (the "shot") of a second average size. Preferably, the second intensity level is reduced from the first intensity level. Preferably, the second average size is smaller than the first average size.

In a preferred implementation, each step of the two-step shot peening process is effectuated to achieve a peened coverage area of between 60-100%. When peened coverage areas of less than 100% are used in each step, the goal is to achieve a final peened coverage area with respect to the treated surface of at least 60%, and more specifically 70-90% and even more preferably which approaches or reaches substantially 100%.

It will further be understood that the shot peening process could utilize more than two separate peening actions. For example, a three-step, four-step, or more-step process could be used. Each step would preferably utilize different average sized media and different intensity levels.

With respect to the lighter shot peen which may be used for the sealing surface, it may only be necessary to utilize a single shot peening action to achieve the desired surface texturing.

DETAILED DESCRIPTION OF THE DRAWINGS

Surface texturing is employed to modify the topography of one or more surfaces (radial, conical or cylindrical or other) of the sealing and/or bearing system for a roller cone rock bit. The surface texturing results in a dimpled surface which retains additional lubricant helpful in reducing friction in the boundary and mixed lubrication regimes. Surface coverage area for the dimpled texture, at least with respect to a bearing surface, should exceed at a minimum 60%, more preferably be between 70-90%, and even more preferably approach or reach approximately 100%. A lighter shot peen (5-60%) may be used in connection with a sealing surface.

With reference to FIGS. 1 and 2, the textured surfaces in the sealing system to which this surface texturing is applied preferably comprise any surface having sliding contact with the seal 60 as the cone rotates. This would include one or more surfaces of the gland 64. More specifically, it would at least include the seal boss 62 surface. Any combination of the foregoing textured surfaces, with desired untextured surfaces, may also be used.

Figure 2A:
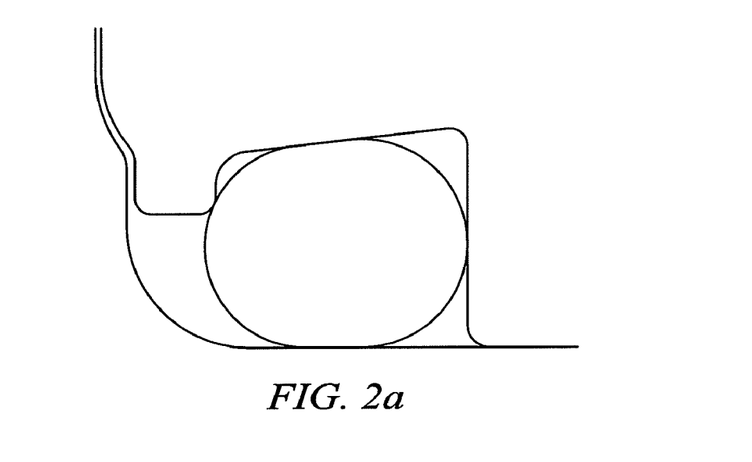
FIGS. 2A-2C illustrate other geometries for a sealing system used in FIG. 2.
Figure 2B:
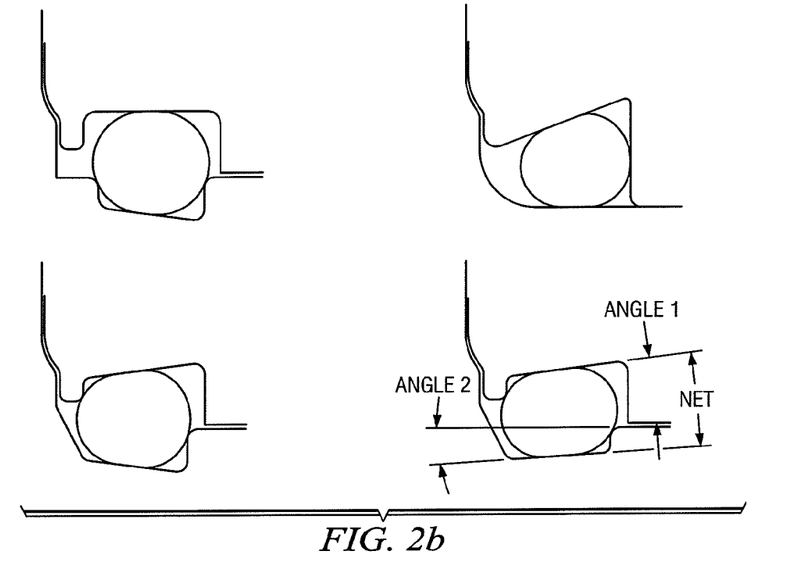
Figure 2C:
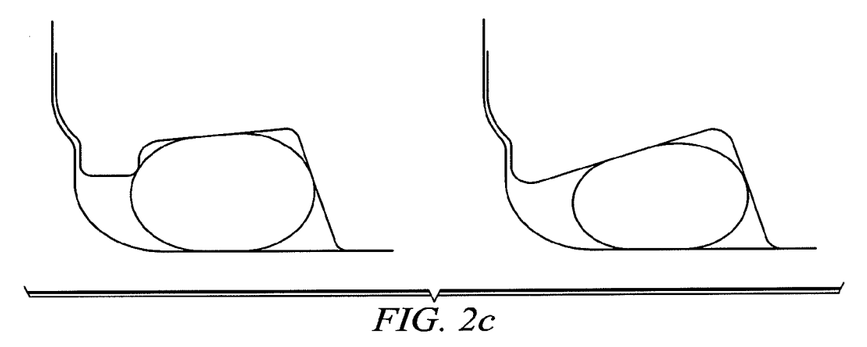

While FIGS. 1 and 2 illustrate the use of cylindrical sealing surfaces associated with the boss 62 and gland 64, the surface texturing may be applied to other geometries for the sealing system such as those illustrated in FIGS. 2a, 2b and 2c. It will be noted that these alternative geometries exploit conical surfaces in connection with the sealing system (on either one of or both of the shaft and cone side of the seal). Thus, any conical or cylindrical surface associated with the seal and functioning as a sealing surface against which the seal 60 rides as the cone rotates is a suitable candidate for texturing.

Reference is once again made to FIGS. 1 and 2 for an identification of textured surfaces in the bearing system to which this surface texturing is applied.

Turning first to the first cylindrical friction bearing 10, surface texturing is provided on one or the other or both of the outer cylindrical surface 20 on the bearing shaft 2 and the inner cylindrical surface 22 of the bushing 24 which has been press fit into the cone 3, these surfaces forming the first cylindrical friction bearing 10 (or main journal bearing).

With respect to the second cylindrical friction bearing 14, surface texturing is provided on one or the other or both of the outer cylindrical surface 30 of the bearing shaft 2 and the inner cylindrical surface 32 of the cone 3.

For the first radial friction bearing 16, surface texturing is provided on one or the other or both of the first radial surface 40 of the bearing shaft 2 and the second radial surface 42 of the cone 3.

Lastly, for the second radial friction bearing 18, surface texturing is provided on one or the other or both of the third radial surface 50 of the bearing shaft 2 and the fourth radial surface 52 of the cone 3.

Any combination of the foregoing textured surfaces, with desired untextured surfaces, may also be used.

The dimples of the surface texturing behave as lubricant reservoirs which permeate the lubrication into inter-space of metal asperities. Meanwhile, higher hydrodynamic pressure is generated on the dimple area. Both functions will facilitate an improvement in sealing and/or bearing system lubrication.

Any one or more of a variety of methods can be used to create the dimpled surface texturing including: machining, chemical etching, laser texturing, deep rolling, vibratory finishing, shot peening, etc. Controllability, uniformity, cost, coverage area, dimple size, dimple depth, and dimple shape factors which influence which method is selected for the surface texturing process.

The dimpled surface texture should be random and with uniform coverage. Preferably, different sized dimples should be present and should be randomly distributed across the surface. A finished coverage area of substantially 100% on the surface of interest is preferred at least with respect to the bearing surface. If the original surface is obliterated entirely by overlapped dimple texturing, then it can be said that 100% coverage area has been achieved. Additionally, the finished surface texture should lack any sharp edges. It will be recognized, however, that benefits accrue from finished coverage areas on the surface of interest in excess of 60%, or more preferably between 70-90%, and on up approaching 100%. The same percentage coverage can be used on both the bearing surface and the sealing surface. Alternatively, a lighter texturing can be used on the sealing surface as compared with the bearing surface. As an example, a lighter texturing of 5-60% coverage can be used on the sealing surface, while a heavier texturing of 60-100% coverage can be used on the bearing surface.

In a preferred implementation, shot peening is chosen to form the dimpled surface texture through topology modification. Shot peening advantageously has characteristics of randomicity but with uniformity of coverage. Shot peening is also a controllable process so that only those desired surfaces will have a modified surface topography (this allows for a machined surface to exist adjacent to a peened surface). As known to those skilled in the art, shot peening is a cold working process in which the surface of a part is bombarded by small spherical media called shot. Each shot leaves a tiny dimple on the surface caused by impact. Shot peening is more widely used to create compressive stress so as to reduce fatigue crack. Inspired by the view that tiny dimples are generated on the surface, shot peening is employed as described herein for a different purpose in creating a dimpled surface texture which can constrain more lubricant in the sealing/bearing surface contact zone(s) and generate increased hydrodynamic pressure which better separates the sealing/bearing surfaces.

Any one or more of the surfaces 20, 22, 30, 32, 40, 42, 50, 52 and 62 (or other gland conical, radial or cylindrical sliding surfaces) described above can be subjected to the shot peening treatment. In a preferred implementation, a two-step (dual) shot peening process is utilized on the surface(s) of interest.

In a first step, shot peening is performed on the surface using a first shot media at a first shot intensity. The shot peening action of the first step is performed for a first period of time in order to obtain a desired coverage area. The shot media is preferably cast steel which is an exemplary implementation has a first average size of 0.011 inches, and the intensity of the first step is 0.007~0.010 C (measured by Almen strip). Alternatively, the shot media is glass bead for softer surfaces such as the inner cylindrical surface 22 of the first cylindrical friction bearing 10 on the bushing 24 (with an intensity of the first step being 0.008~0.012N). In an exemplary implementation, the glass media has an average size of 0.006 inches. The distinction between a hard surface and a soft surface may be made based, for example, on whether the hardness of the material exceeds a certain threshold (such as, for example, a hardness of HRC 45). In the implementation described above for the main journal bearing, the journal of hardened steel material has a hardness of HRC 58-62, while the bushing of beryllium copper has a hardness of about HRC 38.

Preferably for at least the bearing surface and possibly as well the sealing surface, the peened coverage area resulting from completion of this first shot peening step after the first period of time is between 60% and 100%. Coverage in excess of 100% may also be provided. Coverage is defined as the extent (in percent) of complete texturing (for example, dimpling) of the surface by the process step. Thus, with 100% coverage the original surface texture of the surface which has been peened has been obliterated entirely by the first shot peening step. Coverage in excess of 100% is obtained by extending the exposure time to peening beyond that time which is required to achieve 100% coverage. For example: a 200% coverage would be achieved by shot peening the surface for twice the amount of time necessary to obtain a 100% coverage. A lighter shot peen resulting in coverage of 5-60% may alternatively be used for the sealing surface.

Figure 3:
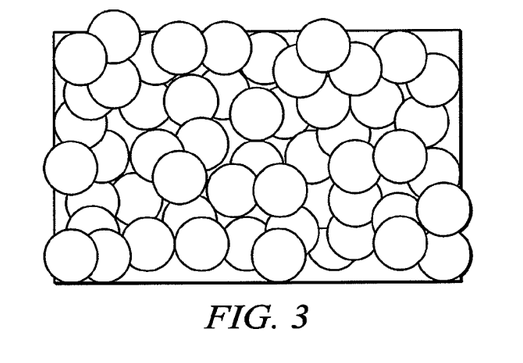
FIG. 3 illustrates an exemplary shot peening impact pattern.

FIG. 3 illustrates an exemplary impact pattern with respect to execution of the first shot peening step with at or about 100% coverage area.

Figure 4:
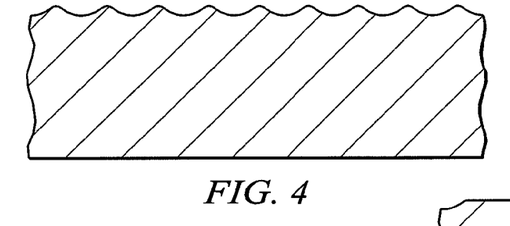
FIG. 4 illustrates, in cross-section, a surface of interest which has been treated by the shot peening of FIG. 3 at or about 100% coverage area.

FIG. 4 illustrates, in cross-section, a surface of interest which has been treated by the first shot peening step.

Figure 5:
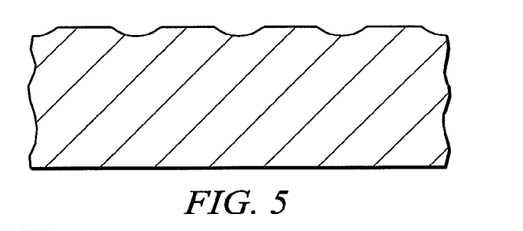
FIG. 5 illustrates, in cross-section, a surface of interest which has been treated by additional shot peening with a coverage area of less than 100%.

Conversely, FIG. 5 illustrates, in cross-section, a surface of interest which has been treated by the first shot peening step with a coverage area of less than 100% (i.e., for a shorter period of time). Such a peen may, for example, be used to effectuate the light texturing used in one implementation for the sealing surface.

In a second step, additional shot peening is performed on the surface (FIGS. 4 or 5) resulting from completion of the first step using a second shot media at a second intensity. The shot peening action of the second step is performed for a second period of time in order to obtain a desired coverage area. The shot media is preferably cast steel having a second average size of 0.011 inches (which is smaller than the first average size), and the intensity of the second step is 0.007~0.010 A (measured by Almen strip). Alternatively, the shot media is smaller glass bead for softer surfaces such as the inner cylindrical surface 22 of the first cylindrical friction bearing 10 on the bushing 24. Preferably, the peened coverage area resulting from completion of this second shot peening step is between 60% and 100%.

Figure 6:
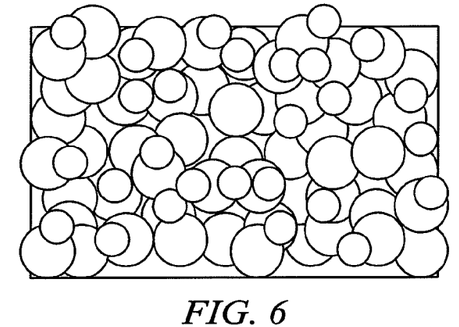
FIG. 6 illustrates an exemplary impact pattern with respect to execution of the additional shot peening.

FIG. 6 illustrates an exemplary impact pattern with respect to execution of the second shot peening step with less than 100% coverage area.

Figure 7:
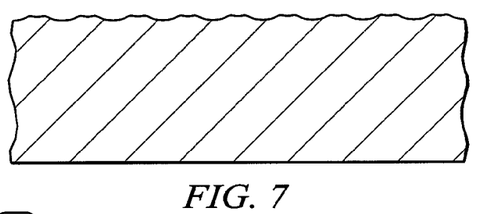
FIGS. 7, 8 and 9 illustrate, in cross-section, a surface of interest which has been treated by an additional shot peening process.

FIG. 7 illustrates, in cross-section, a surface of interest which has been treated by the second shot peening step (when starting from the first step result shown in FIG. 4) for a second period of time necessary to obtain substantially 100% coverage area.

Figure 8:
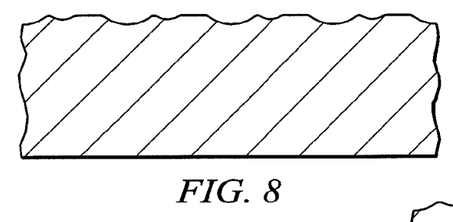

FIG. 8 illustrates, in cross-section, a surface of interest which has been treated by the second shot peening step (when starting from the first step result shown in FIG. 5). In this case, the second step has less than 100% coverage (due to exposure for a shorted second period of time). Again, such a lighter two step peen can be effectively used in one implementation for the sealing surface as well as the bearing surface.

Figure 9:
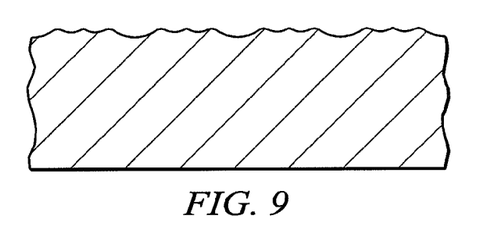

FIG. 9 illustrates, in cross-section, a surface of interest which has been treated by the second shot peening step (when starting from the first step result shown in FIG. 5). In this case, the second step has 100% coverage through selection of the requisite second period of time.

No matter what coverage area percentage is accomplished with the second shot peening, it is preferred that the second shot peening step at a minimum compact, as shown in FIG. 7, any sharp edges present in the surface texture resulting from completion of the first shot peening step (see FIGS. 4 and 5). This will result in an improved surface texturing finish (beneficially reducing the possibility of metal-to-metal contact in the bearing system, for example).

It is preferred with respect to at least the bearing surface that following completion of the shot peening treatment (both or more steps) of the surface of interest, that substantially 100% coverage area for combined first and second step surface treatment with dimpling be achieved. However, there are advantages to coverage areas of greater that 60%, 70-90%, and greater than 90%.

Although a two-step process is described, it will be understood that the shot peening process could utilize more than two separate peening actions. For example, a three-step, four-step, or more-step process could be used. Each step would preferably utilize different average sized media and different intensity levels.

For softer materials, for example at or below a hardness HRC45, only one shot peening step action may be necessary. Harder materials, however, benefit from the performance of two or more shot peening actions as described above.

It will be understood that the cross-sectional surface texture illustrations shown herein are schematic and exemplary in nature. The illustrated regularity and periodicity of the dimple shape and location shown in the FIGURES is not necessarily an accurate illustration of what an actual shot peened surface would look like in cross-section but rather is representative of the results achieved with the two step process. One skilled in the art will understand the topologies which result from each of the first and second steps given different respective first and second periods of time for the peening action.

It is known in the prior art to provide radial and cylindrical sealing/bearing system surfaces having a roughness of 8 to 16 microinches Ra. This would comprise a typical polished surface of standard use (see, also, FIG. 13). As a result of the completion of the surface treatment process described herein, however, the shot-peened bearing surface of interest will have a surface finish roughness greater than 20 microinches Ra (see, also, FIG. 14).

Figure 10:
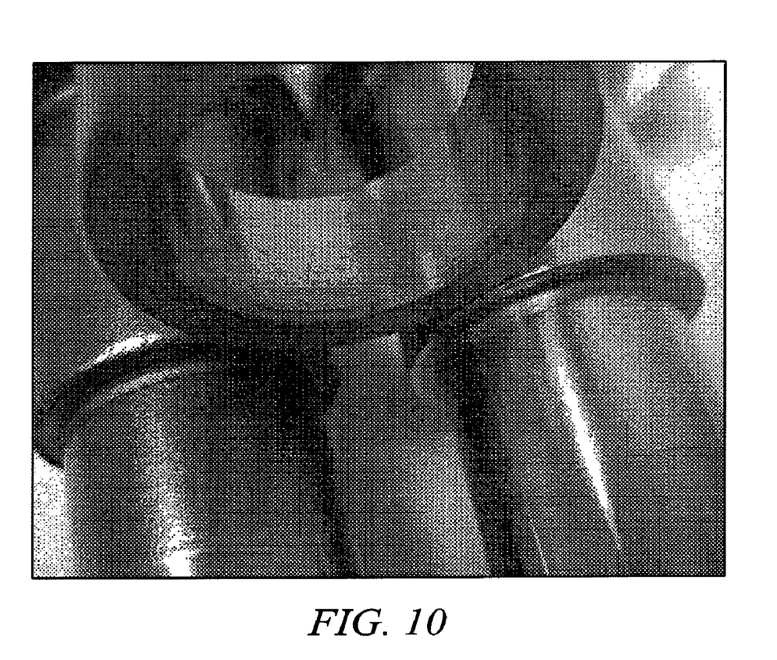
FIGS. 10-12 are images illustrating topography comparisons between surfaces that have subjected to a two-step shot peening process.
Figure 11:
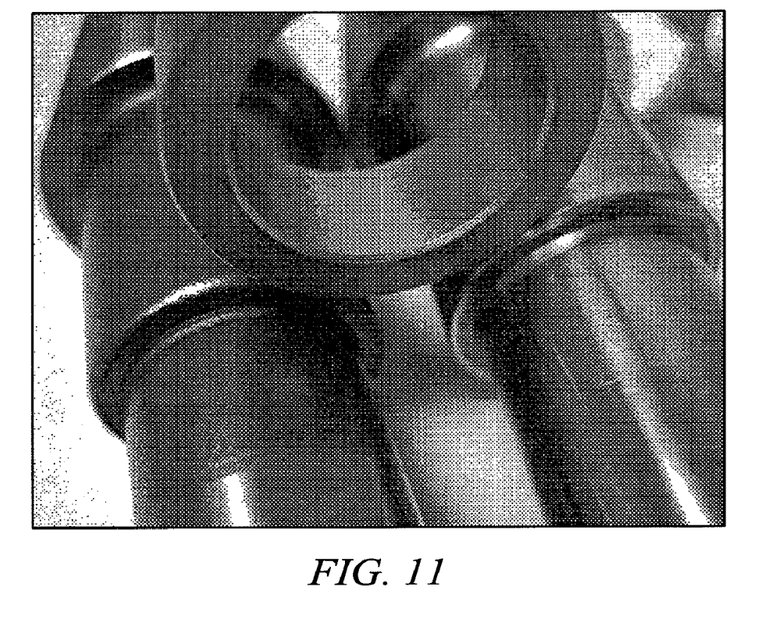
Figure 12:
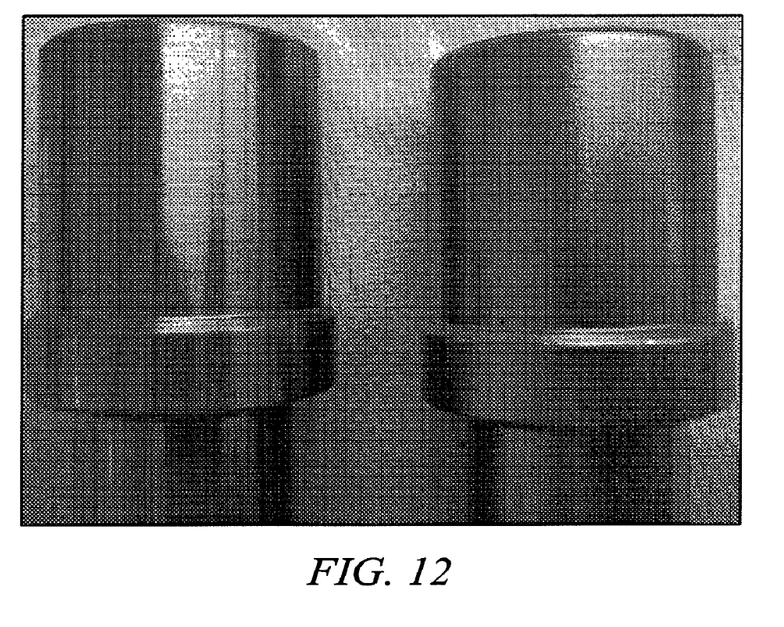

Reference is now made to FIG. 10 which is an image illustrating topography comparisons between surfaces that have been processed in accordance with the two-step shot peening process described above to have a surface roughness of greater than 20 microinches Ra (see, the bearing shaft on the left) and surfaces with conventional surface roughness of 8 to 16 microinches Ra (see, bearing shaft on the right and bushing inner surface at center). FIG. 11 is an image illustrating topography comparisons between surfaces that have been processed in accordance with the two-step shot peening process described above to have a surface roughness of greater than 20 microinches Ra (see, the bearing shaft on the left and bushing inner surface at center) and surfaces with conventional surface roughness of 8 to 16 microinches Ra (see, bearing shaft on the right). FIG. 12 is an image illustrating topography comparisons between surfaces that have been processed in accordance with the two-step shot peening process described above to have a surface roughness of greater than 20 microinches Ra (see, the bearing shaft on the right) and surfaces with conventional surface roughness of 8 to 16 microinches Ra (see, bearing shaft on the left).

Figure 13:
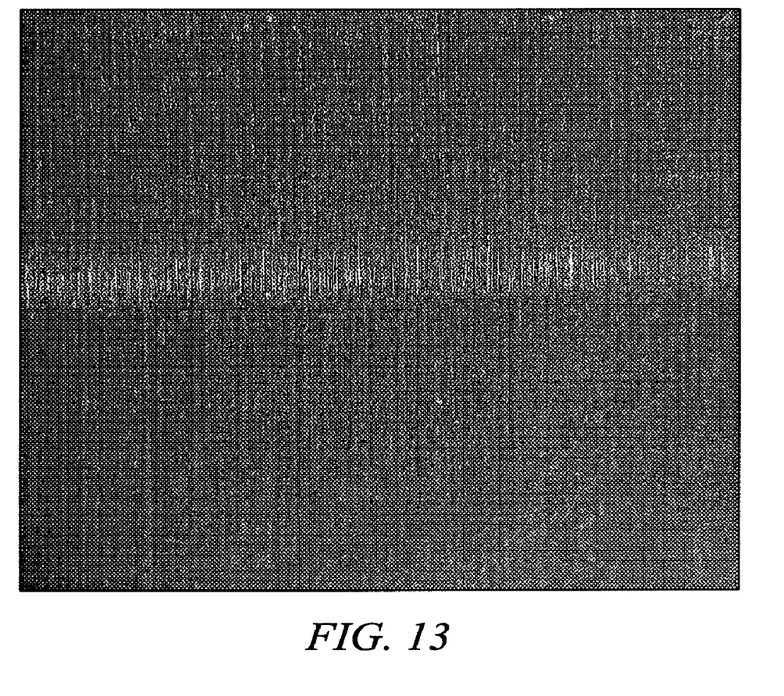
FIG. 13 is an image illustrating the topography of a regular machined surface.

FIG. 13 is an image illustrating the topography of a regular machined surface such as would be used in the prior art for a bearing system surface.

Figure 14:
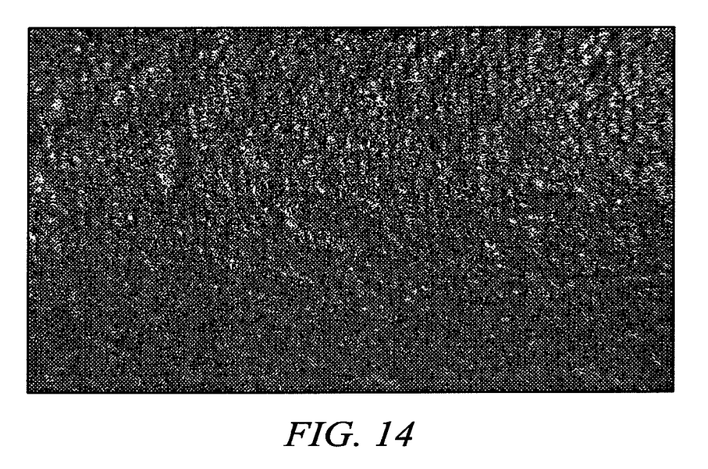
FIG. 14 is an image illustrating the topography of a two-step shot peened surface.

FIG. 14 is an image illustrating the topography of a two-step shot peened surface as produced in accordance with the description above.

Figure 15:
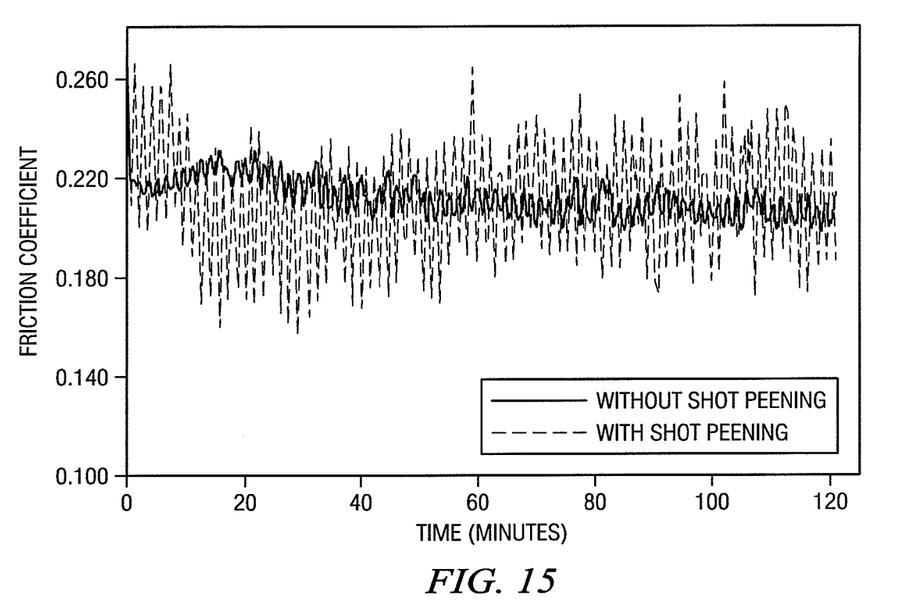
FIGS. 15-19 illustrate the beneficial effect on the friction coefficient which accrues from surface texting.
Figure 16:
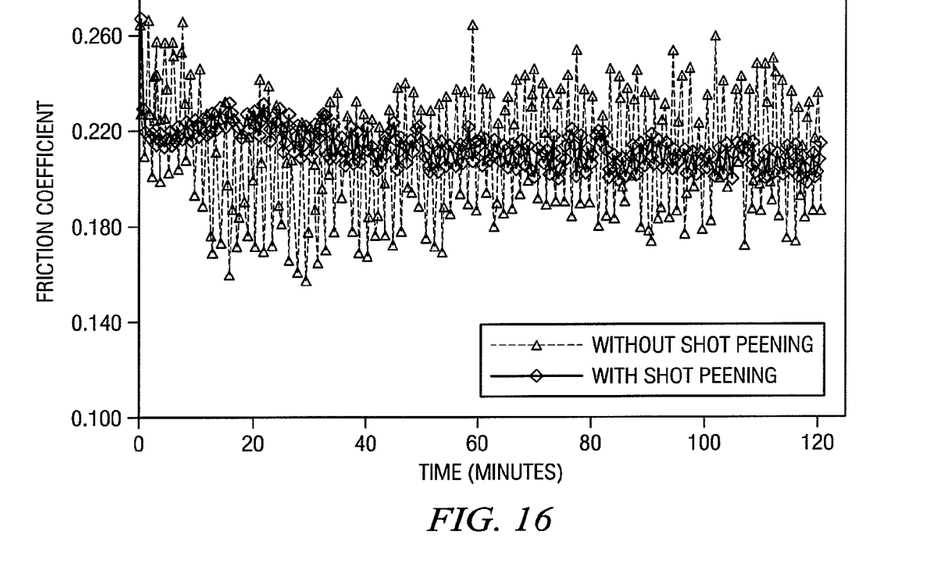

A conventional machined shaft with a conventional machined seal boss (see surface of FIG. 13) and a shaft with a shot-peened seal boss (see surface of FIG. 14) were tested on a test rig under the same operating conditions. FIGS. 15 and 16 illustrate results of that testing and show the beneficial effect surface texting (in general) and two-step shot peening (in particular) in accordance with the process described above has on the friction coefficient in these sealing system configurations. The existence of the small dimples of the produced surface texture generates hydrodynamic pressure, stabilizes or reduces friction. A shaft and seal boss system with a regular machined finish (as known in the art) shows a large variation in friction. For a shot-peened seal boss shaft, however, the micro-dimples provide more reservoirs for grease to lubricate the sliding surface with the seal. Meanwhile, the grease contained in the dimples will generate hydrodynamic pressure to separate the friction couple better. Therefore, the friction tends to be more stable or reduced.

FIGS. 15 and 16 differ only in the manner with which the illustrated data is identified and presented.

Figure 17:
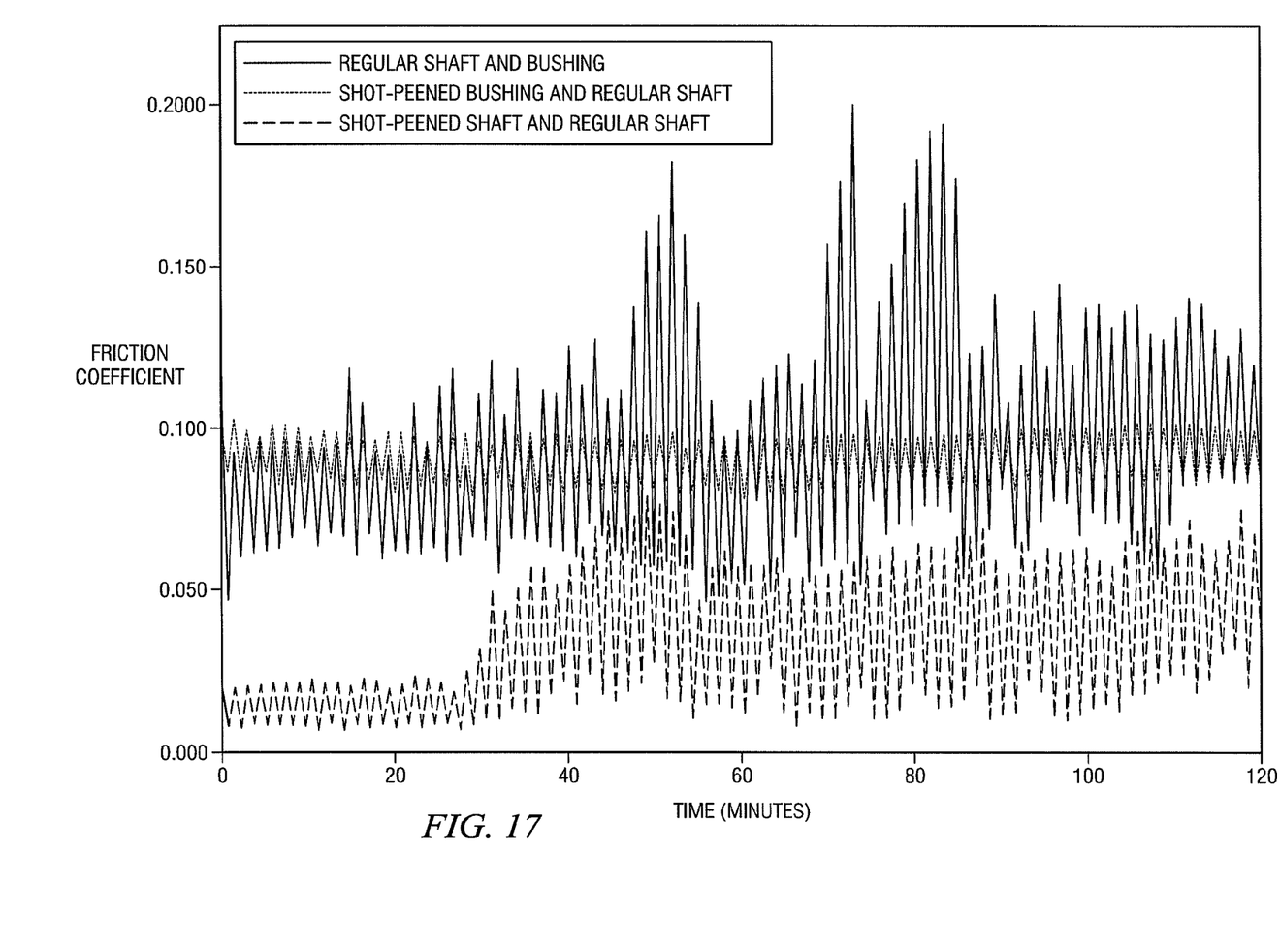
Figure 18:
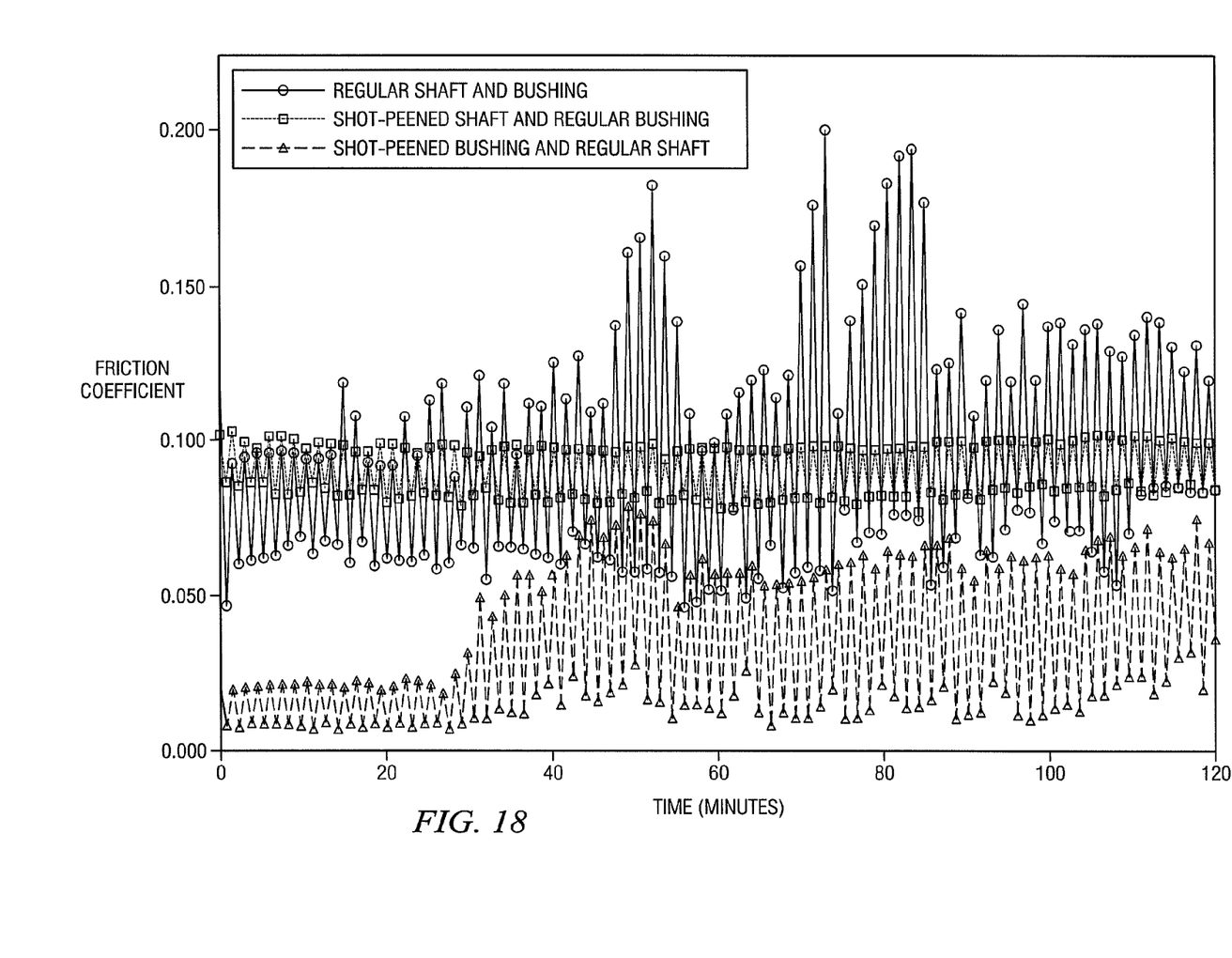

A conventional machined shaft with a conventional machined bushing (see surface of FIG. 13), a shot-peened shaft (see surface of FIG. 14) with a conventional machined bushing, and a conventional machined shaft with a shot-peened bushing, were tested on a bearing test rig under the same operating conditions. FIGS. 17 and 18 illustrate results of that testing and show the beneficial effect surface texting (in general) and two-step shot peening (in particular) in accordance with the process described above has on the friction coefficient in these three bearing system configurations. The existence of the small dimples of the produced surface texture generates hydrodynamic pressure, stabilizes or reduces friction. A shaft and bushing system with a regular machined finish (as known in the art) is exposed to more asperity-to-asperity contact so that the friction in this bearing system configuration shows a large variation. For a shot-peened shaft and/or bushing system (two implementations illustrated), however, the micro-dimples provide more reservoirs for grease to lubricate the rubbing surfaces. Meanwhile, the grease contained in the dimples will generate hydrodynamic pressure to separate the friction couple better. Therefore, the friction tends to be more stable or reduced.

FIGS. 17 and 18 differ only in the manner with which the illustrated data is identified and presented.

Figure 19:
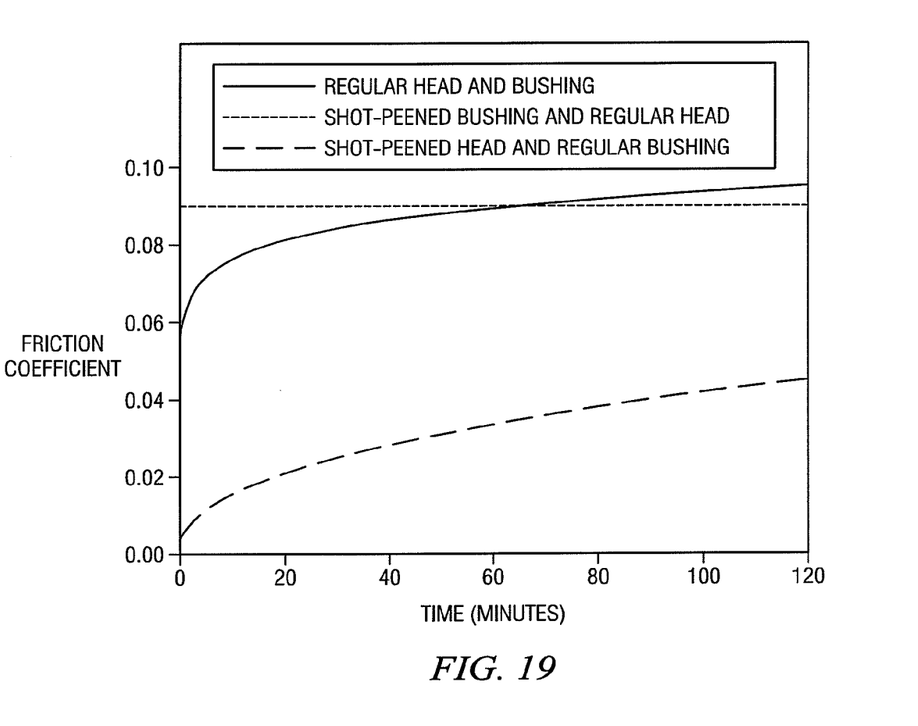

Reference is now made to FIG. 19 which also illustrates the effect shot peening in accordance with the two-step process described above has on the friction coefficient in these three bearing configurations. FIG. 19 illustrates the same information as presented in FIGS. 17 and 18, but the presentation is made in a different way. The FIG. 19 illustration loses some information shown in FIGS. 17-18 concerning friction variation in the regular head and bushing system and its deduction in a shot-peened head and bushing system. Nonetheless, the frictional benefits of the surface textured finishes for the bearing system as described herein are evident.

In summary, a surface textured sealing system is presented for use in a rock bit. Tiny dimples are created by a two-step shot peening process on one or more surfaces of interest in connection with the sealing system (for example, the seal boss or other sliding surface with respect to the seal). The dimples of random distribution and non-uniform size are formed over the surface of interest (for example with at least 60% coverage area for the bearing surface) and work as reservoirs to constrain more lubricant in the surface contact zone. Hydrodynamic pressure is generated in the dimple area and the seal friction is reduced. Correspondingly, the sealing working condition is improved.

In summary, a surface textured head bearing is presented for use in a rock bit. Tiny dimples are created by a two-step shot peening process on one or more surfaces of interest in connection with the bearing system (for example, in the main journal bearing). The dimples of random distribution and non-uniform size are formed over the surface of interest (at least 60% coverage area) and work as reservoirs to constrain more lubricant in the surface contact zone. Hydrodynamic pressure is generated in the dimple area and the bearing friction is reduced. Correspondingly, the bearing working condition is improved.

Embodiments of the invention have been described and illustrated above. The invention is not limited to the disclosed embodiments.

What is claimed is:

1. A rock bit, comprising:
a shaft including a sealing surface and further including a cylindrical bearing surface adjacent the sealing surface;
a roller cone having an annular gland;
wherein the roller cone is rotatably mounted to the shaft such that the annular gland aligns with the sealing surface; and
wherein the sealing surface has a surface texture comprised of a plurality of dimples having a random distribution formed by shot peening in a two step process including a first shot peening action wherein the sealing surface is bombarded at a first intensity level by first small spherical media of a first average size and a subsequent second shot peening action wherein the sealing surface is bombarded at a second intensity level by second small spherical media of a second average size.

2. The rock bit of claim 1 wherein the sealing surface has a hardness of HRC 58-62.

3. The rock bit of claim 2 wherein the dimples cover between 5-60% of the sealing surface.

4. The rock bit of claim 2 wherein the dimples cover between 60-100% of the sealing surface.

5. The rock bit of claim 1 wherein the first shot peening action surface textures between 5-100% of the sealing surface.

6. The rock bit of claim 5 wherein the second shot peening action surface textures between 5-100% of the sealing surface.

7. The rock bit of claim 1 wherein each of the first and second shot peening actions surface textures 100% of the sealing surface.

8. The rock bit of claim 2 wherein the sealing surface is one of either a cylindrical or conical sealing surface.

9. The rock bit of claim 2, wherein the cylindrical bearing surface on the shaft has a surface texture, that surface texture including a plurality of dimples.

10. The rock bit of claim 9 wherein the dimples cover, with respect to both the sealing surface and the bearing surface, between 60-90% of the surface.

11. The rock bit of claim 9 wherein the dimples cover, with respect to both the sealing surface and the bearing surface, substantially 100% of the surface.

12. The rock bit of claim 9 wherein the cylindrical bearing surface is radially offset from the sealing surface.

13. The rock bit of claim 9 wherein the sealing surface is one of either a cylindrical or conical sealing surface on the shaft.

14. The rock bit of claim 9 wherein the dimples cover, with respect to the sealing surface, less than 60% of the surface, and cover, with respect to the bearing surface, between 60-100% of the surface.

15. The rock bit of claim 2 wherein the plurality of dimples have a non-uniform size.

16. The rock bit of claim 1, further comprising an o-ring type seal having a surface sliding along the sealing surface.

17. The rock bit of claim 1, further comprising a bushing received by the roller cone, the bushing being rotatably mounted to the shaft such that the bushing aligns with the cylindrical bearing surface.

18. The rock bit of claim 17 wherein one of an inside or outside cylindrical surface of the bushing has a surface texture comprised of a plurality of dimples which cover at least 60% of the one of the inside or outside cylindrical surface.

* * * * *